(12) United States Patent
Clute et al.

(10) Patent No.: US 7,607,687 B2
(45) Date of Patent: Oct. 27, 2009

(54) BELT INTEGRATED PELVIS AIRBAG WITH PRETENSIONER

(75) Inventors: Gunter K Clute, Bloomfield Hills, MI (US); Robert Mical, Dearborn Heights, MI (US)

(73) Assignee: Autoliv ASP, Inc., Ogden, UT (US)

( * ) Notice: Subject to any disclaimer, the term of this patent is extended or adjusted under 35 U.S.C. 154(b) by 283 days.

(21) Appl. No.: 11/489,035

(22) Filed: Jul. 19, 2006

(65) Prior Publication Data
US 2008/0018085 A1    Jan. 24, 2008

(51) Int. Cl.
*B60R 21/18* (2006.01)
(52) U.S. Cl. .................. 280/733; 280/807; 242/374; 242/376
(58) Field of Classification Search ............ 280/733, 280/801.1, 807, 808; 242/374, 376
See application file for complete search history.

(56) References Cited

U.S. PATENT DOCUMENTS

| | | | |
|---|---|---|---|
| 5,443,222 A * | 8/1995 | Modinger et al. ........... 242/374 |
| 5,881,962 A | 3/1999 | Schmidt et al. | |
| 6,010,151 A | 1/2000 | Honda | |
| 6,336,657 B1 * | 1/2002 | Akaba et al. ................. 280/733 |
| 6,363,722 B1 * | 4/2002 | Takehara et al. .............. 60/632 |
| 6,382,666 B1 * | 5/2002 | Devonport ................... 280/733 |
| 6,419,176 B1 * | 7/2002 | Mizuno ....................... 242/374 |
| 6,669,131 B2 * | 12/2003 | Takehara et al. ............ 242/374 |
| 6,722,600 B2 * | 4/2004 | Hamaue et al. ............. 242/374 |
| 7,401,815 B2 * | 7/2008 | Clute .......................... 280/803 |
| 7,407,184 B2 * | 8/2008 | Stevens et al. .............. 280/736 |
| 2003/0001041 A1 * | 1/2003 | Yoon ....................... 242/382.6 |
| 2004/0169104 A9 * | 9/2004 | Shiotani et al. ............. 242/374 |
| 2006/0097506 A1 * | 5/2006 | Stevens ...................... 280/806 |
| 2006/0208124 A1 * | 9/2006 | Clute .......................... 242/374 |

* cited by examiner

*Primary Examiner*—Toan C To
(74) *Attorney, Agent, or Firm*—Sally J Brown; Brinks Hofer Gilson & Lione

(57) ABSTRACT

An airbag integrated into a belt portion of a seat belt assembly for a motor vehicle seat belt system. The seat belt assembly includes seat belt webbing forming the lap belt portion and a shoulder belt portion and a spool assembly engaging the shoulder belt portion of the seat belt webbing. The seat belt assembly incorporates a gas driven pretensioner system incorporating at least one gas generator connected to the spool assembly and the belt airbag.

28 Claims, 10 Drawing Sheets

BELT INTEGRATED PELVIS AIRBAG WITH PRETENSIONER

FIELD OF THE INVENTION

This invention relates to automotive safety restraint systems and, in particular, to an active three-point belt system having both a seat belt retractor pretensioner and a belt integrated airbag.

BACKGROUND OF THE INVENTION

Numerous designs of passive and active automotive occupant restraint systems are known for enhancing occupant protection in the event of a vehicle impact. Passive systems are deployed with no action required by the occupant and include inflatable restraints or air bags for frontal and side impacts. Automatically deployed seat belt systems are known. Active systems, such as seat belts, have been used for many decades and are manually deployed by the occupant. The conventional seat belt system uses three points of connection with the vehicle structure and incorporates a lap belt portion for engaging the occupant's lower torso, and a shoulder belt portion for engaging the occupant's upper torso. When used, the seat belt restrains movement of the occupant in the event of a vehicle impact or rollover event. In order to enhance the comfort and convenience provided by the seat belt system, retractors are used which permit belt webbing to be extracted from and retracted into the retractor, allowing movement of the occupant while maintaining the belt in close contact with the occupant. An inertia sensitive vehicle sensor which may be used with a webbing sensor, locks the retractor when an impact or rollover event is detected, preventing further extraction of webbing to restrain the occupant.

A more recent development in the area of seat belt systems is that of the so-called inflatable seat belt. An inflatable seat belt system incorporates a section of the shoulder or lap belt section which is inflated by a gas, typically by a pyrotechnic inflator, to increase its size and volume. Thus, when an inflatable seat belt is deployed, the normally narrow seat belt webbing expands significantly to reduce the contact pressure between the belt and the occupant during an impact event. Inflatable seat belts also act as a belt pretensioner by reducing belt slack. In addition, when an inflatable lap belt is deployed, the inflating lap belt may act as a side impact airbag. Inflatable seat belts are typically deployed using the crash sensing systems also used to deploy other inflatable restraint systems upon the detection of a vehicle impact or rollover event having predetermined dynamic characteristics.

Another feature for enhancing performance of seat belt systems is belt pretensioners. Belt pretensioners cinch the seat belt webbing against the occupant, eliminating slack immediately upon the detection of a vehicle impact. Other types act on a seat belt anchorage to pull down on the anchorage to reduce slack. Reducing the slack in the seat belt system enables the occupant's forward motion to quickly engage the seat belt to begin dissipating impact energy. Various designs of retractor pretensioners are presently known, including a type known as a Roto-Pretensioner which incorporates a series of balls in a gas duct which are driven by the firing of a gas generator to engage with and wind the retractor spool sprocket to retract the webbing.

Incorporating seat belt systems such as pretensioners and inflatable set belts increases cost and complexity of the resistant system. Automotive suppliers are under considerable competitive pressure to provide vehicle components which are cost-effective and provide high levels of performance.

BRIEF SUMMARY OF THE INVENTION

The restraint system in accordance with the present invention provides advantages over the shortcomings of the prior art. In one series of embodiments illustrated and described herein, a single inflator gas source is coupled both to a retractor pretensioner assembly and to the inflatable seat belt. This achieves economies by avoiding the necessity of duplicating the inflator gas sources and the associated firing lines, wiring and mounting hardware. In this way, a single pretensioning control signal and firing loop may be used to fire the gas source to cause pretensioning of the spool and expand the inflatable seat belt.

Additional embodiments of the retractor system of this invention are also described. Such additional embodiments illustrate various means of implementing a retractor pretensioner. Alternate types of systems may also be used which simultaneously provide pretensioning and inflation. For example, a piston and cylinder cable type pretensioner may be provided. In such designs, a cable attached to a piston wraps around a sector connected with the spool to cause it to undergo pretensioning rotation as the piston is driven within a cylinder under the influence of a gas source. In addition, a rack and pinion type pretensioner can be provided in which a toothed rack engaging a pinion gear on a sprocket rotates the sprocket when the rack is stroked. Such stroking can be accomplished by numerous means including piston and cylinder gas actuation or other actuators.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
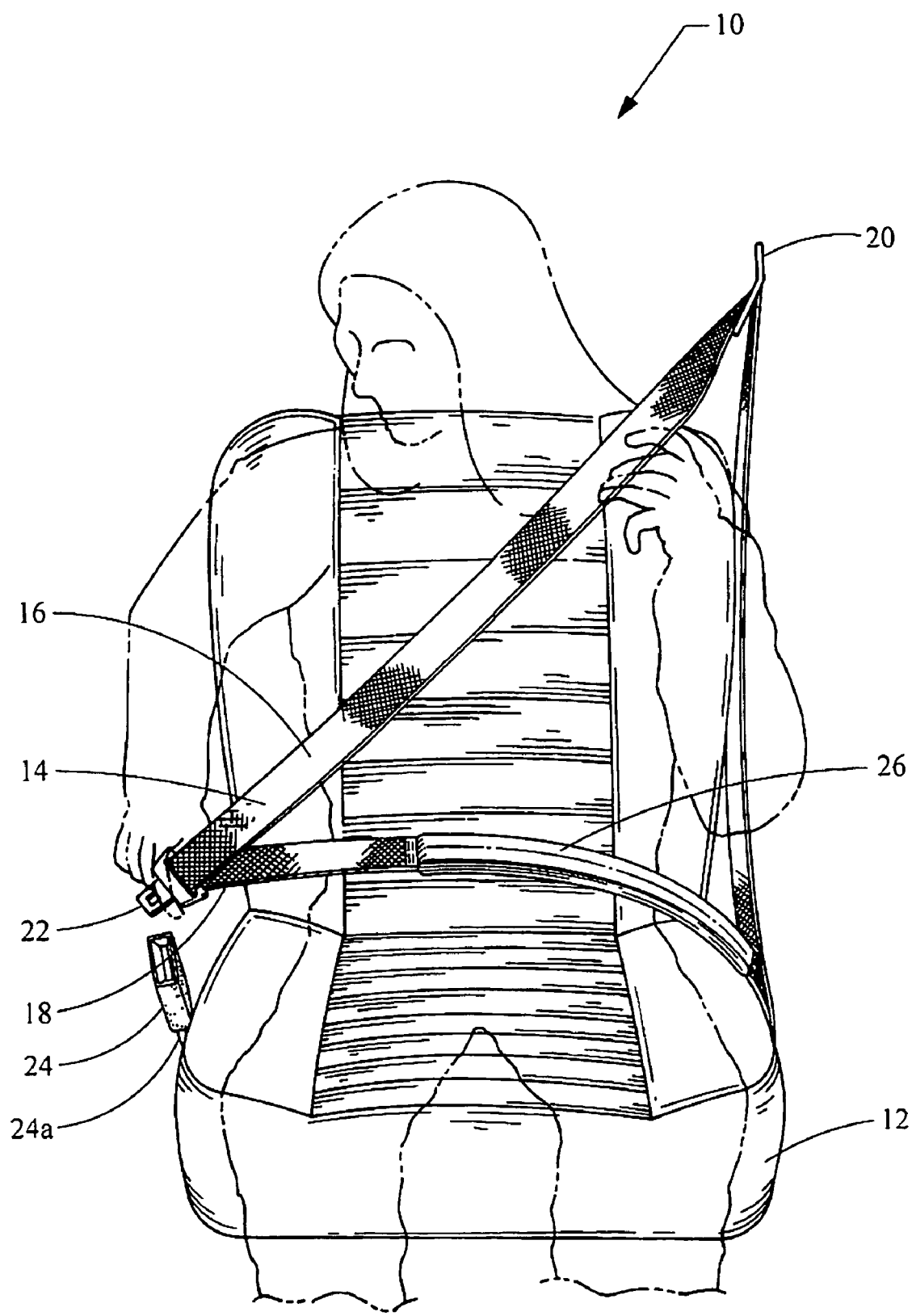
FIG. 1 is a front view of a motor vehicle occupant using a seat belt system incorporating an inflatable lap belt section according to the present invention.

With reference to FIG. 1, a seat belt system 10 for protecting an occupant seated in vehicle seat 12 is shown. Seat belt system 10 principally comprises a webbing 14 which includes an upper shoulder belt portion 16, and a lower lap belt portion 18. The shoulder belt portion 16 passes around a "D" ring 20 which is typically mounted to the "B" pillar of the motor vehicle (the vertical structural member separating the front and rear doors of a four-door vehicle). A seat belt latch plate or tongue 22 is attached to the seat belt webbing 14 and is received by a seat belt buckle 24 which is typically attached to the vehicle floor pan or the seat cushion frame by buckle webbing 24a. In this embodiment, having a single spool retractor, the seat belt latch plate 22 slides along the webbing 14.

In the embodiment illustrated in FIG. 1, the lap belt portion 18 further includes a webbing tube 27 (shown in FIG. 2a) coupled to an inflatable belt section 26. Inflatable belt section 26 is in communication, via the webbing tube 27, with a gas source 25 (also shown in FIG. 2) causing the inflatable belt section 26 of the lap belt 18 to rapidly expand in cross-section upon the detection of a vehicle impact. Alternately, the inflatable belt section 26 may be in communication with the gas source 25 by, for example, an inflation tube separate from the webbing 14 (not shown). Inflation of the inflatable belt section 26 reduces the contact pressure between the lap belt portion 18 and the occupant's pelvis in the event of a frontal impact and further acts to pretension the belt system. In addition, the inflated belt section 26 acts as a side airbag in the event of a side impact (see FIG. 5). Since the inflatable belt section 26 must be properly positioned on the occupant, the pretensioning system of this invention is particularly suited for use with such designs.

Figure 2A:
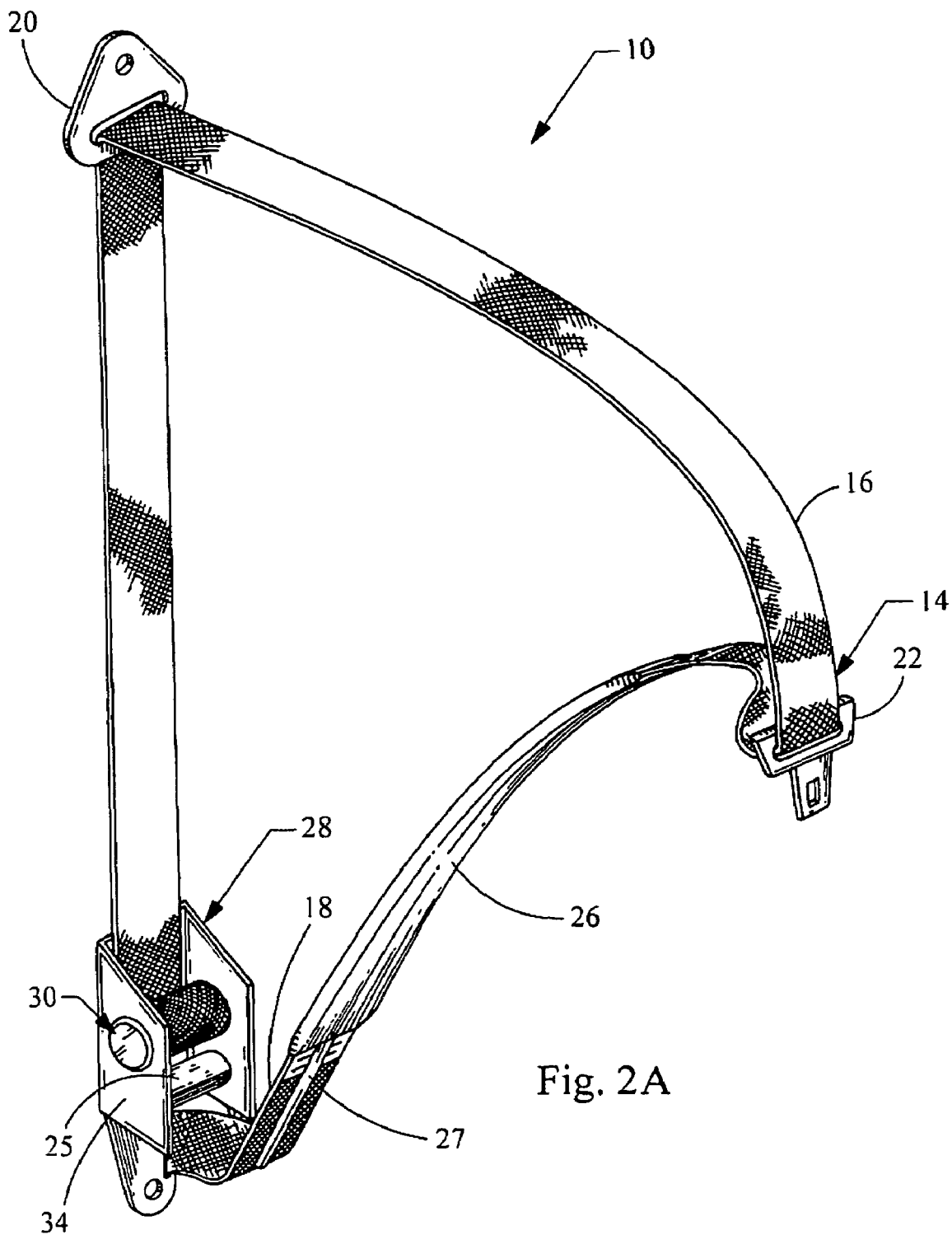
FIG. 2a is an isometric view of the seat belt system of FIG. 1 detailing the components of one embodiment of the seat belt system.

Now with particular reference to FIG. 2a, an isometric view of one embodiment the seat belt system 10 of the present invention is illustrated disassociated from the motor vehicle and showing a single spool retractor assembly 28. This figure differs from FIG. 1 also in that it illustrates the same system, but on the front seat passenger side of the vehicle. The retractor assembly 28 is preferably mounted behind trim panels within the "B" pillar of the motor vehicle. Retractor assembly 28 includes a spool assembly 30 and the gas source 25 mounted to a common frame 34. Spool assembly 30 is connected with and stows the webbing 14 of the shoulder belt portion 16, whereas the end of the lap belt portion 18 of the webbing 14 is fixedly engaged with an anchorage, for example, the frame 34, the "B" pillar, or another portion of the motor vehicle such as the seat 12. The vertically extending portion of the webbing 14 extending from the spool assembly 30 and wrapping around D-ring 20 is preferably positioned behind a vehicle trim panel on the B-pillar. It is also possible to implement the present invention in a so-called integrated structural seat application in which the spool retractor assembly 28, D-ring 20, and the anchorage for buckle 24 are directly carried by the structure of seat 12.

Figure 3:
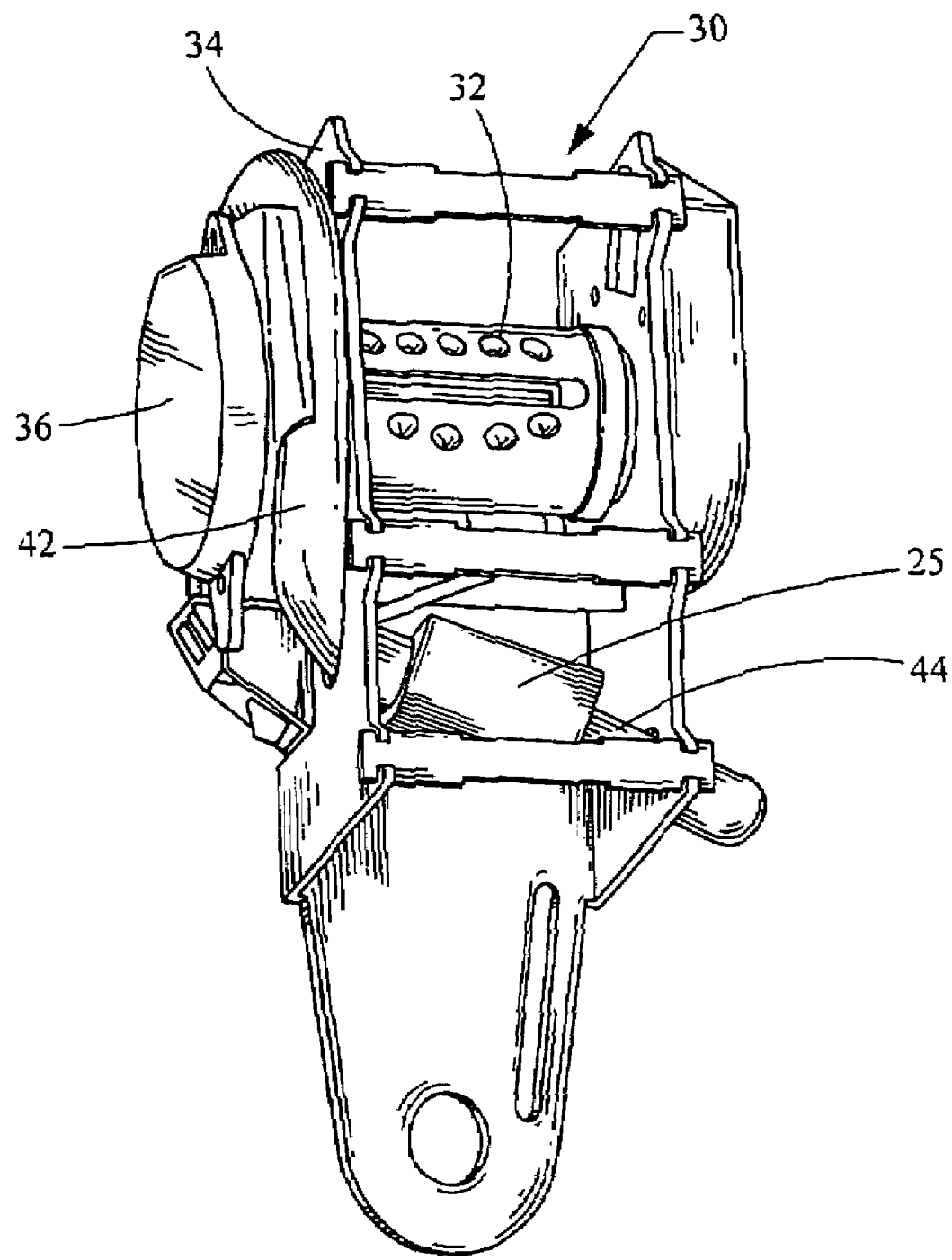
FIG. 3 is an isometric view of a retractor assembly of the seat belt system in accordance with the present invention.
Figure 4:
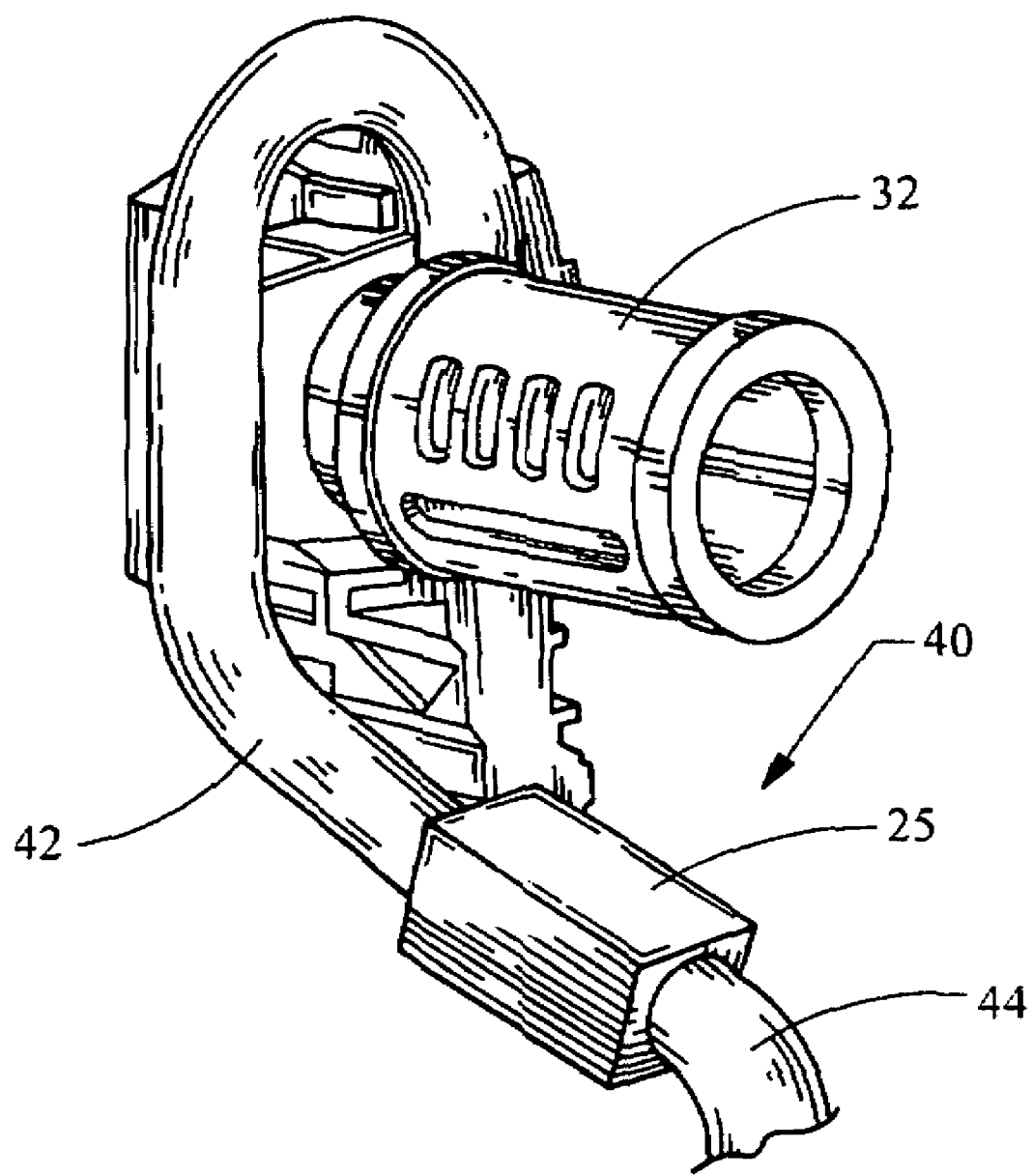
FIG. 4 is an isometric view of the pretensioner assembly of the retractor assembly of FIG. 3 in accordance with the present invention.

Additional details of the retractor assembly 28 are provided with reference to FIGS. 3 and 4. Spool assembly 30 includes belt spool 32 which engages the shoulder belt portion 16 of the webbing 14 and rotates to wind-up or pay-out belt webbing 14. A torsional "clock" or "motor" type spring is carried within spring end cap 36 and rotationally biases the spool to retract the webbing. Spool assembly 30 may further incorporate other spool control mechanisms which are known in accordance with the prior art, including pretensioners, inertia and webbing sensitive locking devices or other belt control devices. "Spool control systems" referred to in this specification describes any system which controls the rotational movement of a webbing spool, thus controlling the extraction and retraction of seat belt webbing. Spool locking devices typically incorporate an inertia sensitive element, such as a rolling ball or pendulum, and cause a sprocket of the spool to be engaged to prevent further withdrawing of webbing from spool 32. Webbing sensitive locking devices sense rapid pay-out of webbing to lock the retractor. Various electronic sensing mechanisms which detect the withdrawal of webbing and/or the connection of the tongue 22 to the buckle 24 may also be incorporated into retractor assembly 28. As noted above, spool assembly 30 is mounted to a retractor frame 34.

The retractor assembly 28 further incorporates, in accordance with a principal feature of this invention, a pretensioner system 40. As mentioned previously, a pretensioner is a device which winds seat belt webbing into a more taught condition against the occupant at the initial stages of a detected vehicle impact. This is provided to reduce forward motion or excursion of the occupant in response to the deceleration forces of a vehicle impact or rollover. The pretensioner system, best illustrated in Figured 4 and 6 and designated by reference number 40, utilizes features known in accordance with the prior art. Pretensioner system 40 is similar to what is known as the assignees' "Roto-Pretensioner." The pretensioner system 40 is directly coupled with the spool assembly 30.

Figure 5:
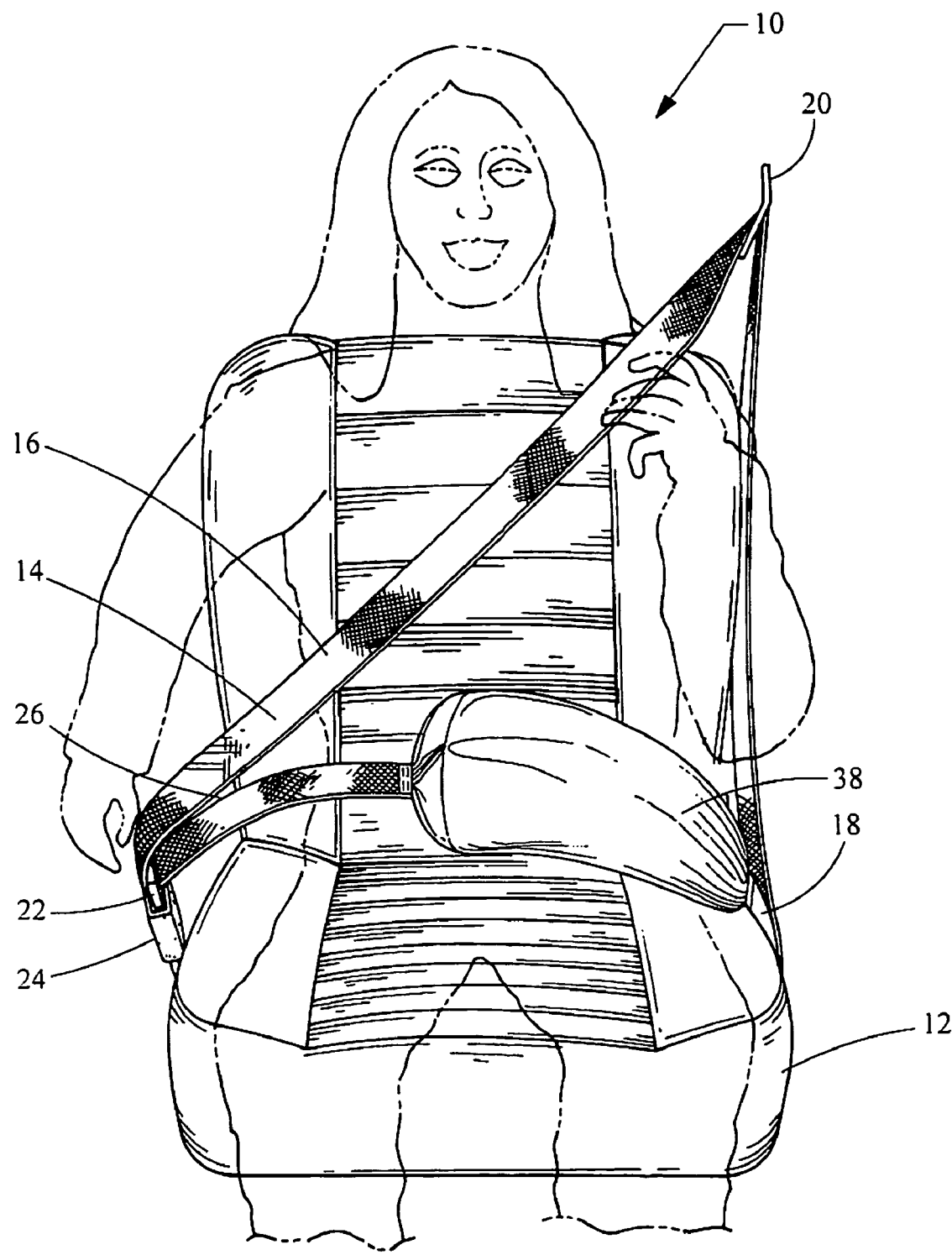
FIG. 5 is a front view of the restraint system of FIG. 1 showing an inflatable belt section in an expanded state.

With particular reference to FIG. 4, the gas source 25 is used to provide expanding gas in response to a crash signal and is fired or activated by electrical impulses. These impulses are generated by a vehicle restraint system controller (not shown) which receives signals from vehicle crash sensors used to detect the occurrence of a vehicle impact. Gas source 25 is coupled with a pretensioner tube 42 and the lap belt tube 44. The pretensioner acting on the spool assembly 30 operates to rotate the spool 32 for pretensioning, for the reasons mentioned previously. In addition, gas from the gas source 25 is communicated through the lap belt tube 44, along the lap belt portion 18 via, the example, the webbing tube 27 of the webbing 14 and into the inflatable belt section 26. As a result, referring to FIG. 5, the inflatable belt section 26 expands at substantially the same time the spool 32 rotates to pretension the webbing 14. To provide side impact protection, the inflatable belt section 26 may be configured as a side impact airbag 38 configured such that at least a portion of the airbag 38 will inflate between the side of the vehicle and the occupant as shown in FIG. 5. This provides additional protection for the occupant in the event of a side impact collision.

Figure 2B:
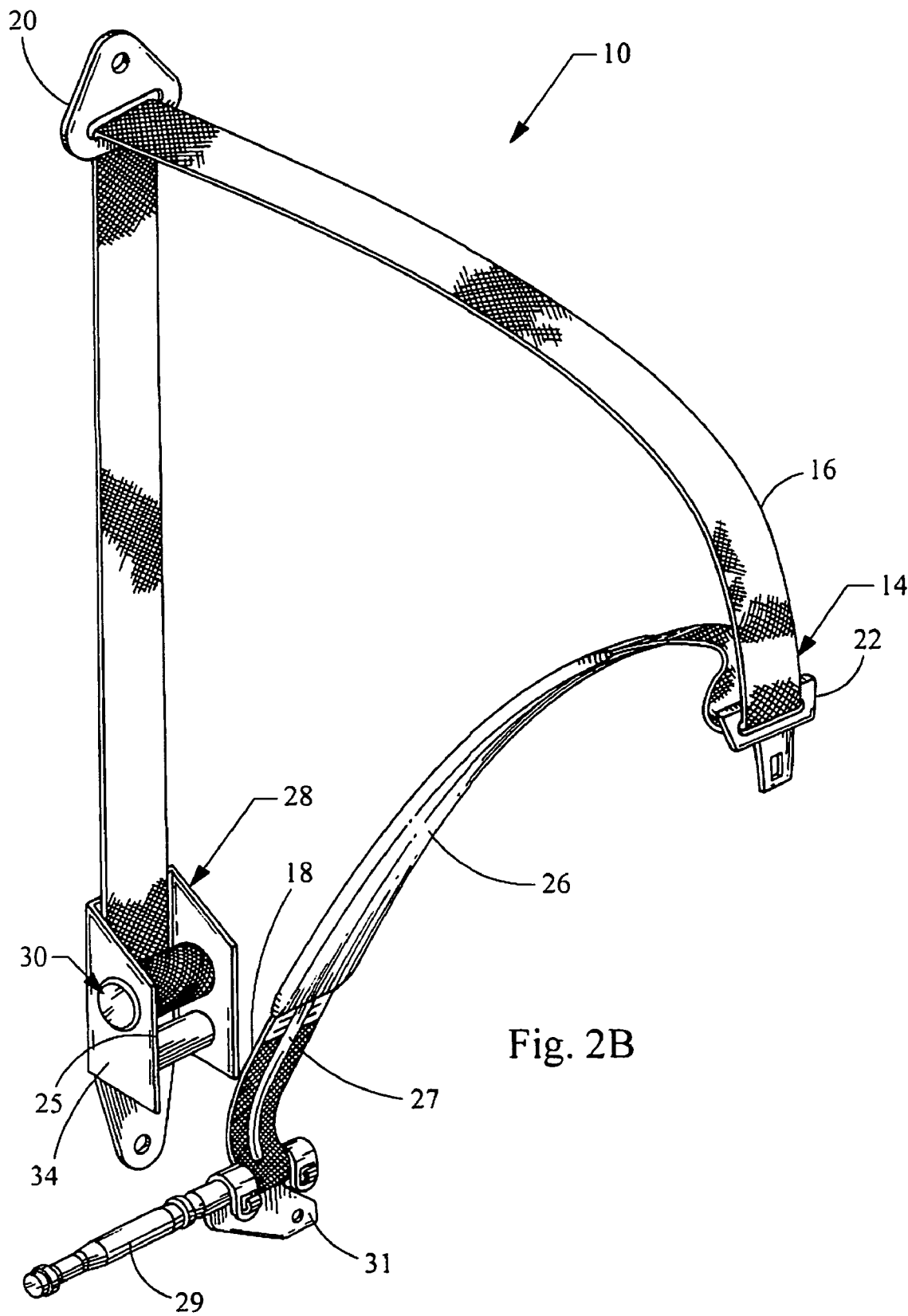
FIG. 2b is an isometric view of the seat belt system of FIG. 1 detailing the components of another embodiment of the seat belt system.

As described above, a single gas source 25 actuates the pretensioner system 40 and inflates the airbag 38. However, referring to FIG. 2b, other embodiments may include separate gas sources to separately actuate the pretensioner 40 and inflate the airbag 38. For example, FIG. 2b shows a second gas source 29 attached to the webbing tube 27. In this embodiment, the lap belt portion 18 is separately secured by means of a lap anchor 31 to, for example, the "B" pillar, the seat 12, or another portion of the motor vehicle. The second gas source 29 of this embodiment is attached to the lap anchor 31. Thus, the vehicle restraint system controller (not shown) may send signals to activate the gas source 25 and the second gas source 29 either independently or simultaneously. This permits greater flexibility in response to different crash signals and permits the gas sources 25 and 29 to be configured to provide an optional amount of gas to the pretensioner system 40 and the airbag 38.

Figure 6:
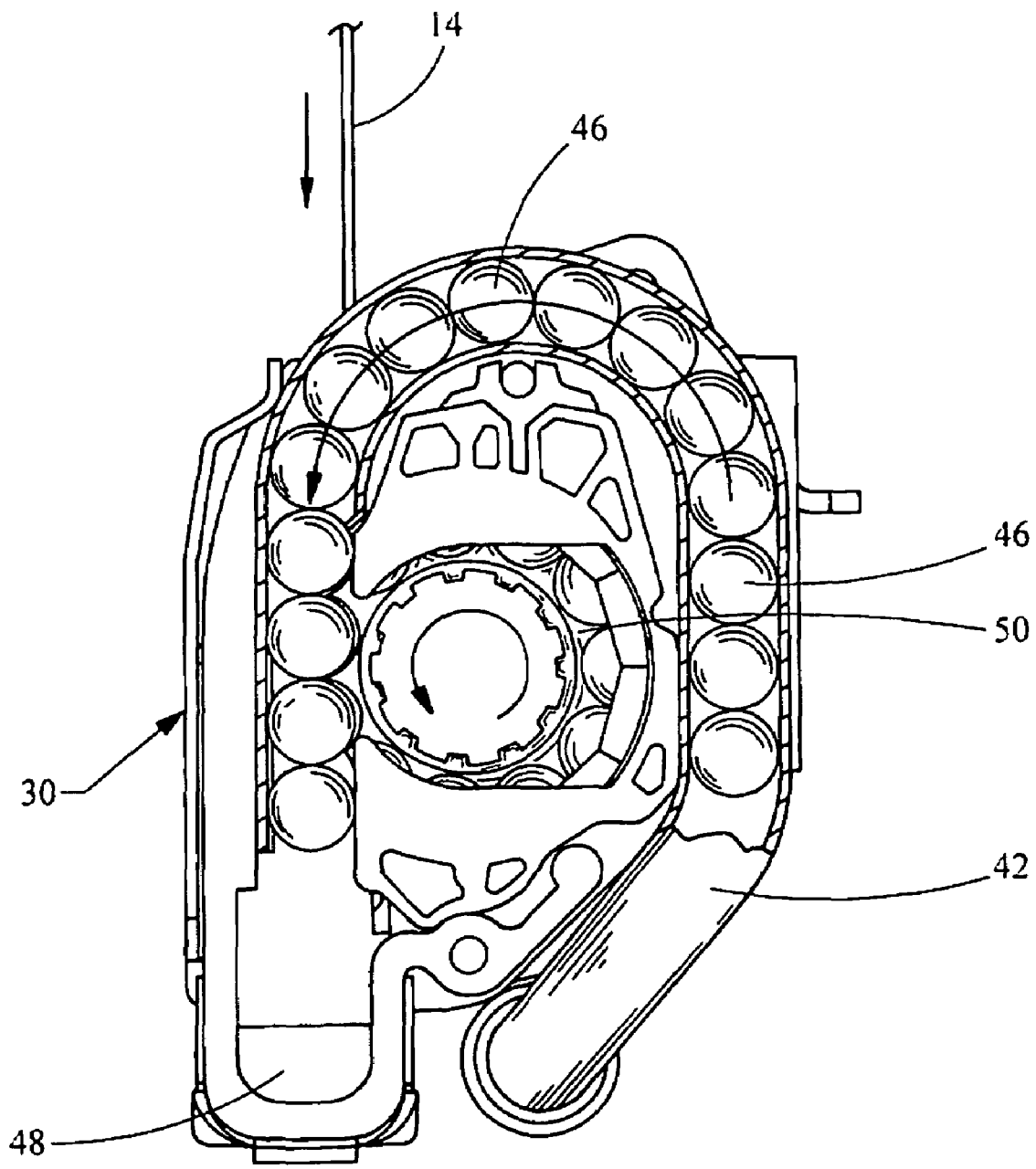
FIG. 6 is a section view showing the operation of the pretensioner assembly of the retractor assembly of FIG. 3.

FIG. 6 provides a cut-away illustration of the operation of the pretensioner tube 42 acting on the lap belt spool assembly 30. As shown in the cut-away illustration, pretensioner tube 42 includes a plurality of internally stored metal balls 46. These balls are initially maintained in a position generally as shown in FIG. 6. Upon the activation of gas source 25 to generate gas, the balls 46 are forcibly driven toward ball trap 48 which forms the termination of pretensioner tube 42. As the balls 46 are driven through tube 42, they engage spool sprocket 50, much in the manner that a bicycle chain sprocket is engaged by a chain. The movement of balls 46 causes a predetermined number of degrees of angular rotation of spool 32 to occur which provides pretensioning. Once balls 46 fill ball trap 48, pretensioning winding of the spool does not continue. The system is designed to cause a predetermined angular movement of the spool to provide a degree of webbing retraction desired to satisfy occupant safety objectives.

Figure 7:
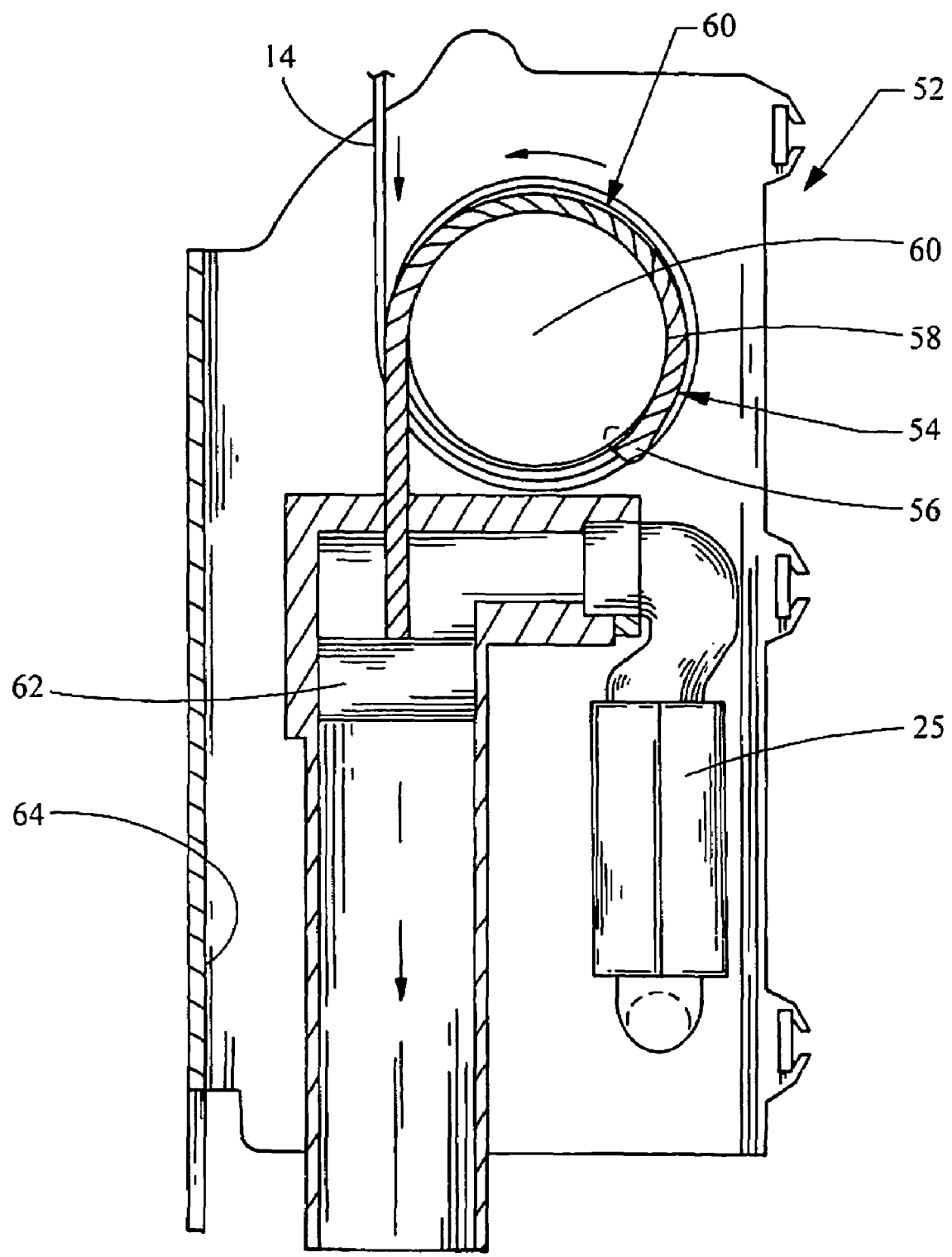
FIG. 7 is a section view of a retractor assembly in accordance with an alternate embodiment of the present invention utilizing a cable driven pretensioner assembly.
Figure 8:
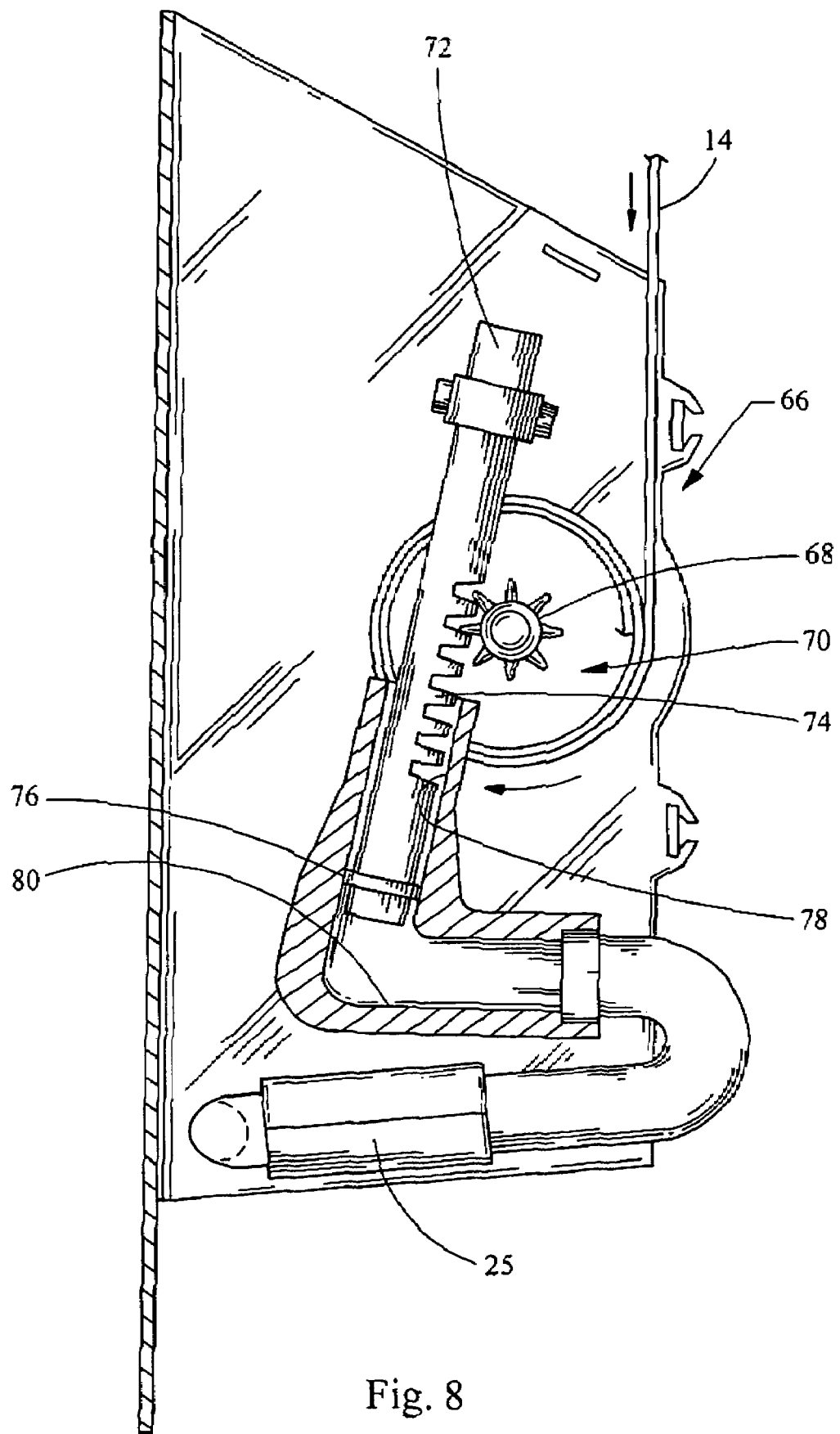
FIG. 8 is a section view of another retractor assembly in accordance with a third embodiment of the present invention utilizing a rack and pinion pretensioner assembly.
Figure 9:
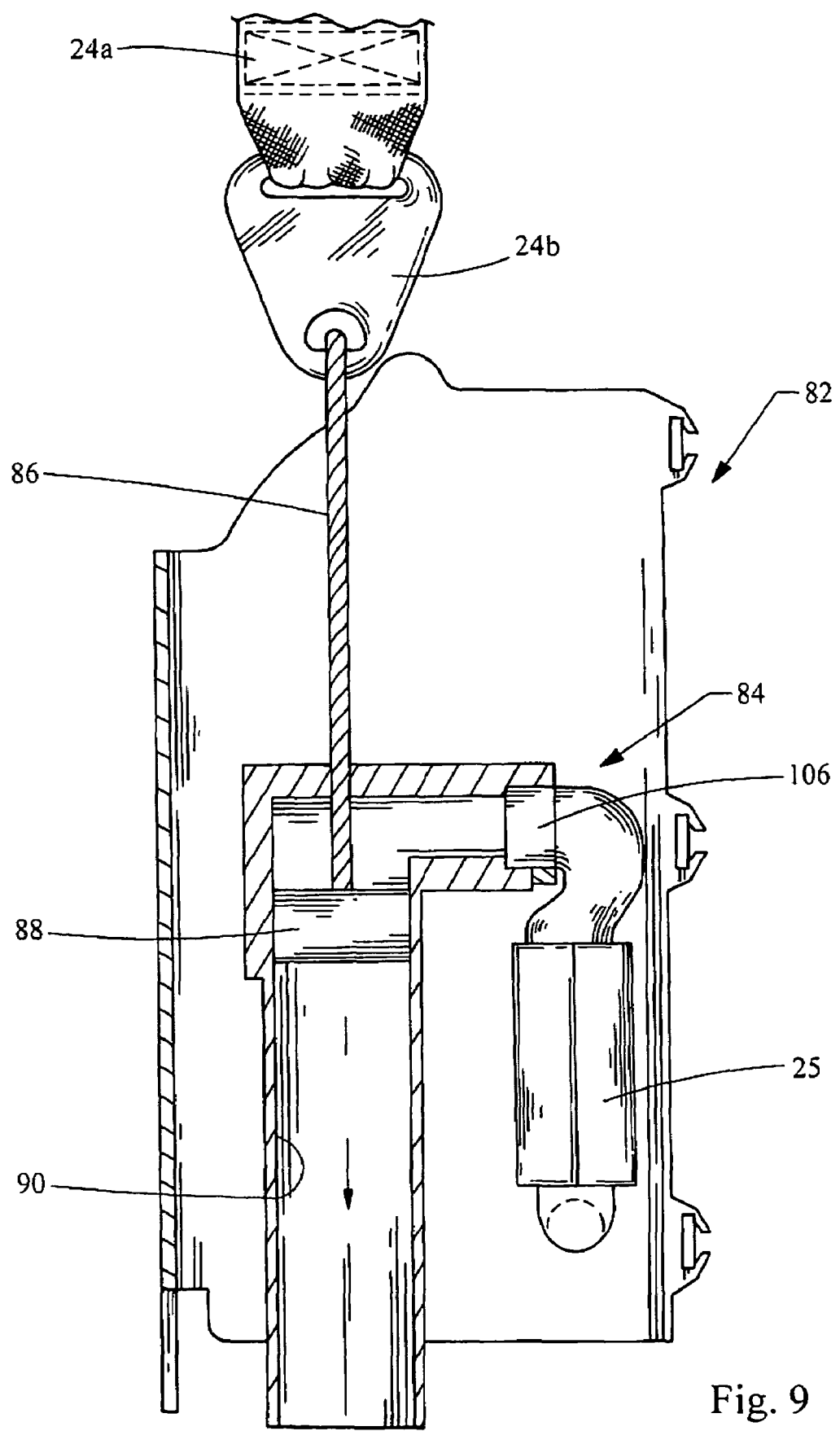
FIG. 9 is a section view of a retractor assembly in accordance with a fourth embodiment of the present invention utilizing a linear cable pretensioner attached to a buckle anchor.

FIGS. 7, 8 and 9 illustrate alternate embodiments of a spool retractor assembly in accordance with the principles of the present invention. Elements having features common with those previously described are identified by like reference number without a repetition of their description.

FIG. 7 illustrates diagrammatically a spool retractor assembly 52 in accordance with a second embodiment of the present invention. For this embodiment, an alternate type of pretensioner assembly 54 is provided. In this instance, pretensioner assembly 54 incorporates a wound cable 56 which wraps around pulley 58 which engage with shoulder belt spool assembly 60. Cable 56 is connected with plunger 62 which fits within cylinder 64. A gas source 25 generates gas upon receiving an appropriate firing signal and the increase in pressure within cylinder 64 forcing plunger 62 to stroke to bottom out in the cylinder. This process pulls on cable 56 which, through its interaction with pulley 58, causes pretensioning rotation of spool assembly 60. As in the previous embodiments, retractor assembly 52 causes pretensioning rotation for the spool assemblies to occur in opposite rotational directions.

The next embodiment of the present invention shown in FIG. 8 utilizes a rack and pinion or gear pinion type pretensioner assembly. This alternate retractor assembly 66 uses a pinion gear 68 engaged with a spool assembly 70. In retractor assembly 66, a toothed rack 72 features rows of teeth 74 engaging pinion gear 68. The end of toothed rack 72 features plunger 76 which fits within cylinder 78. The gas source 25 provides gas within chamber 80 and causes toothed rack 72 to stroke in an upward direction, thus causing rotation of pinion gears 68. This causes rotation of spool assembly 70 during a pretensioning situation.

FIG. 9 illustrates a linear retractor assembly 82 in accordance with another embodiment of the present invention. For this embodiment, the linear pretensioner assembly 84 is acting on a buckle anchor 24b of the buckle webbing 24a. In this instance, pretensioner assembly 84 incorporates a cable 86 attached to the buckle anchor 24b. Cable 86 is connected with piston 88 which fits within a bore 90. The gas source 25 generates gas upon receiving an appropriate firing signal and the increase in pressure within bore 90 forces the piston 88 to stroke to the bottom of the bore 90. This process pulls on the cable 86 which, being attached to the buckle anchor 24b, pulls on the buckle 24 shown in FIG. 1 via the buckle webbing 24a. Consequently, the buckle 24 pulls on the webbing 14 through the latch plate 22, pretensioning the seat belt assembly 10. The gas source 25 may also be connected to the inflatable belt section 26, as discussed in connection with the previously described embodiments for inflation of said belt section 26, or a separate gas source may be provided for the inflatable belt section 26.

While the above description constitutes the preferred embodiment of the present invention, it will be appreciated that the invention is susceptible to modification, variation, and change without departing from the proper scope and fair meaning of the accompanying claims.

The invention claimed is:

1. A seat belt assembly for a motor vehicle having a belt webbing including a shoulder belt portion and a lap belt portion, and a latch plate being engageable with a buckle and attached to the webbing, the assembly comprising:
   a seat belt pretensioner for retracting the belt webbing;
   an inflatable seat belt section of the belt webbing; and
   at least one gas source supplying a gas to the pretensioner and to the inflatable seat belt section for activating the pretensioner and inflating the inflatable seat belt section in response to a control signal.

2. A seat belt assembly in accordance with claim 1 wherein the gas source supplies the gas to the pretensioner through a pretensioner tube coupled to a spool for winding the belt webbing, and the gas source further supplies the gas to the inflatable seat belt section through an inflation tube for expanding the inflatable seat belt section.

3. A seat belt assembly in accordance with claim 2 wherein the gas source comprises two gas sources, a first gas source being attached to the pretensioner tube for causing winding of the belt webbing, and a second gas source being attached to the inflation tube for supplying the gas and expanding the inflatable seat belt section.

4. A seat belt assembly in accordance with claim 3 wherein the second gas source is further attached to a seat of the motor vehicle.

5. A seat belt assembly in accordance with claim 2 wherein the pretensioner tube conducts the gas from the gas source to a pretensioner sprocket coupled with the spool and wherein the gas flowing in the pretensioner tube interacts with the pretensioner sprocket to cause rotation of the spool for winding the belt webbing onto the spool for pretensioning the belt webbing.

6. A seat belt assembly in accordance with claim 5 further comprising a plurality of balls positioned in the pretensioner tube which are forced to move in the pretensioner tube in response to the gas from the gas source to engage with the pretensioner sprocket to cause rotation of the spool.

7. A seat belt assembly in accordance with claim 2 wherein the inflation tube is integral with the lap belt portion, the inflation tube being coupled to both the gas source and the inflatable seat belt section and configured to conduct the gas from the gas source to the inflatable seat belt section.

8. A seat belt assembly in accordance with claim 7 wherein the inflation tube is formed of tubular belt webbing of the lap belt portion.

9. A seat belt assembly in accordance with claim 1 wherein the inflatable seat belt section is configured as a side airbag to provide side impact protection.

10. A seat belt assembly in accordance with claim 2 wherein the spool is mounted to a frame adapted to be mounted to a "B" pillar of the motor vehicle.

11. A seat belt assembly in accordance with claim 1 wherein the pretensioner comprises a cable wrapped around a spool assembly pulley and affixed to a plunger within a cylinder, and the gas flowing from the gas source urges the plunger to move within the cylinder, thereby pulling the cable and causing the pulley to rotate, causing the spool assembly to provide pretensioning rotation for retracting the belt webbing.

12. A seat belt assembly in accordance with claim 1 wherein the pretensioner comprises a rack engaging a spool pinion gear coupled with a spool assembly, and the rack being coupled to a plunger in a cylinder, wherein the gas from the gas source urges the plunger to move in the cylinder causing the rack to rotate the spool pinion gear thereby rotating the spool assembly for providing pretensioning rotation for retracting the belt webbing.

13. seat belt assembly in accordance with claim 1 wherein the pretensioner includes a piston within a cylinder, the piston being attached to the buckle and the cylinder being in communication with the gas source.

14. A seat belt assembly in accordance with claim 13 further comprising a pretensioner tube which conducts the gas from the gas source to the cylinder, wherein the gas flowing in the pretensioner tube interacts with the piston to linearly retract the buckle to pretension the belt webbing via the latch plate.

15. A seat belt assembly for a motor vehicle having a belt webbing including a shoulder belt portion and a lap belt portion, and a latch plate being engageable with a buckle and attached to the webbing, the assembly comprising:
    a retractor including a frame for mounting to a vehicle, a spool for winding the webbing and a seat belt pretensioner for retracting the belt webbing;
    an inflatable seat belt section of the belt webbing; and
    at least one gas source for generating a gas for activating the pretensioner and inflatable seat belt; wherein
    the at least one gas source communicates with the pretensioner through a pretensioner tube coupled to the spool, and the at least one gas source further communicates with the inflatable seat belt section by means of an inflation tube for expanding the inflatable seat belt section in response to a control signal.

16. A seat belt assembly in accordance with claim 15 wherein two of the gas sources are provided, a first gas source being attached to the pretensioner tube for winding the belt webbing, and a second gas source being attached to the inflation tube for expanding the inflatable seat belt section.

17. A seat belt assembly in accordance with claim 16 wherein the second gas source is further attached to a seat of the motor vehicle.

18. A seat belt assembly in accordance with claim 15 wherein the inflatable seat belt section is configured as a side impact airbag to provide side impact protection.

19. A seat belt assembly in accordance with claim 15 wherein the pretensioner tube conducts the gas from the gas source to a pretensioner sprocket coupled with the spool and wherein the gas flowing in the pretensioner tube interacts with the pretensioner sprocket to cause rotation of the spool for winding the webbing into the spool for pretensioning the belt webbing.

20. A seat belt assembly in accordance with claim 19 further comprising a plurality of balls positioned in the pretensioner tube which are forced to move in the pretensioner tube in response to the gas from the gas source to engage the pretensioner sprocket and cause rotation of the spool.

21. A seat belt assembly for a motor vehicle occupant restraint system having a belt webbing including a shoulder belt portion and a lap belt portion, and a latch plate being engageable with a buckle and attached to the webbing, the assembly comprising:
    a retractor including a frame for mounting to a vehicle, a spool for winding the belt webbing and a seat belt pretensioner for retracting the belt webbing;
    an inflatable seat belt section of the webbing; and
    at least one gas source for generating a gas for activating the pretensioner and inflatable seat belt section; wherein
    the gas source communicates with the pretensioner through a pretensioner tube coupled to the spool, and the gas source further communicates with an inflation tube integral with the lap belt portion, the inflation tube being coupled to both the gas source and the inflatable seat belt section and being configured to conduct the gas from the gas source to the inflatable seat belt section, resulting in expansion of the inflatable seat belt section in response to a control signal, the inflatable seat belt section being configured as a side impact airbag.

22. A seat belt assembly in accordance with claim 21 wherein two gas sources are provided, a first gas source being attached to the pretensioner tube for winding the webbing, and a second gas source being attached to the inflation tube for expanding the inflatable seat belt section.

23. A seat belt assembly in accordance with claim 22 wherein the second gas source is further attached to a seat of the motor vehicle.

24. A seat belt assembly in accordance with claim 21 wherein the pretensioner tube conducts the gas from the gas source to a pretensioner sprocket coupled with the spool and wherein the gas flowing in the pretensioner tube interacts with the pretensioner sprocket to cause rotation of the spool for winding the belt webbing onto the spool for pretensioning the belt webbing.

25. A seat belt assembly in accordance with claim 24 further comprising a plurality of balls positioned in the pretensioner tube which are forced to move in the pretensioner tube in response to the gas from the gas source to engage the pretensioner sprocket and cause rotation of the spool.

26. A seat belt assembly in accordance with claim 1 wherein the at least one gas source comprises a single gas source which supplies the gas both to the seat belt pretensioner and the inflatable seat belt section.

27. A seat belt assembly in accordance with claim 15 wherein the at least one gas source comprises a single gas source which communicates both with the seat belt pretensioner and the inflatable seat belt section.

28. A seat belt assembly in accordance with claim 21 wherein the at least one gas source comprises a single gas source which communicates both with the seat belt pretensioner and the inflatable seat belt section.

* * * * *